(12) United States Patent
Wein et al.

(10) Patent No.: US 8,776,327 B2
(45) Date of Patent: Jul. 15, 2014

(54) KITS FOR QUICK ATTACHING AND DISCONNECTING AN ITEM

(75) Inventors: Michael Wein, Houston, TX (US); Stephen Douglas Alexander, Houston, TX (US)

(73) Assignee: The Dual Magnetic Interlocking Pin System, LLC, Houston, TX (US)

( * ) Notice: Subject to any disclaimer, the term of this patent is extended or adjusted under 35 U.S.C. 154(b) by 438 days.

(21) Appl. No.: 13/083,364

(22) Filed: Apr. 8, 2011

(65) Prior Publication Data

US 2011/0191988 A1 Aug. 11, 2011

Related U.S. Application Data

(63) Continuation of application No. PCT/US2009/059575, filed on Oct. 5, 2009.

(60) Provisional application No. 61/103,906, filed on Oct. 8, 2008.

(51) Int. Cl.
*A44B 99/00* (2010.01)
*A45F 5/00* (2006.01)

(52) U.S. Cl.
USPC ............................................ 24/303

(58) Field of Classification Search
USPC ............................................ 24/303
See application file for complete search history.

(56) References Cited

U.S. PATENT DOCUMENTS

| | | | | |
|---|---|---|---|---|
| 2,901,278 A * | 8/1959 | Robinson | 292/251.5 |
| 3,041,697 A * | 7/1962 | Budreck | 24/303 |
| 3,111,737 A * | 11/1963 | Heil | 24/303 |
| 3,670,438 A * | 6/1972 | Carroll et al. | 40/600 |
| 3,815,066 A | 6/1974 | Vinal | |
| 3,906,763 A | 9/1975 | Bochory | |
| 4,081,114 A | 3/1978 | Inoue | |
| 4,230,224 A | 10/1980 | Weeks | |
| 4,265,002 A * | 5/1981 | Hosken | 24/303 |
| 4,603,453 A * | 8/1986 | Yokoyama | 70/57.1 |
| 4,622,726 A * | 11/1986 | Nakamura | 24/574.1 |
| 4,903,370 A * | 2/1990 | Erdmann | 16/87.2 |
| 5,209,090 A * | 5/1993 | Stillwagon | 70/456 R |
| 5,317,789 A * | 6/1994 | Levy | 24/303 |
| 5,740,557 A | 4/1998 | Reid et al. | |
| 5,967,767 A | 10/1999 | Khon | |
| 5,975,661 A | 11/1999 | Jeziorowski et al. | |
| 6,848,288 B1 | 2/2005 | Derman | |
| 7,308,737 B2 * | 12/2007 | Saitoh et al. | 24/303 |
| 7,441,424 B2 * | 10/2008 | Saitoh et al. | 70/19 |
| 8,402,612 B2 * | 3/2013 | Wein et al. | 24/303 |
| 2007/0251062 A1* | 11/2007 | Saitoh et al. | 24/303 |
| 2008/0248434 A1* | 10/2008 | Wein | 431/253 |
| 2010/0263172 A1* | 10/2010 | Wein et al. | 24/303 |
| 2011/0283574 A1* | 11/2011 | Ellman et al. | 40/209 |

* cited by examiner

*Primary Examiner* — Robert J Sandy
*Assistant Examiner* — Louis Mercado
(74) *Attorney, Agent, or Firm* — Buskop Law Group, PC; Wendy Buskop

(57) ABSTRACT

Kits enabling one or more items to be attached or detached using an assembly with a magnet for providing a magnetic attraction strong enough to movably hold the magnet adjacent a first outer plate for a quick connecting and disconnecting of an item.

17 Claims, 26 Drawing Sheets

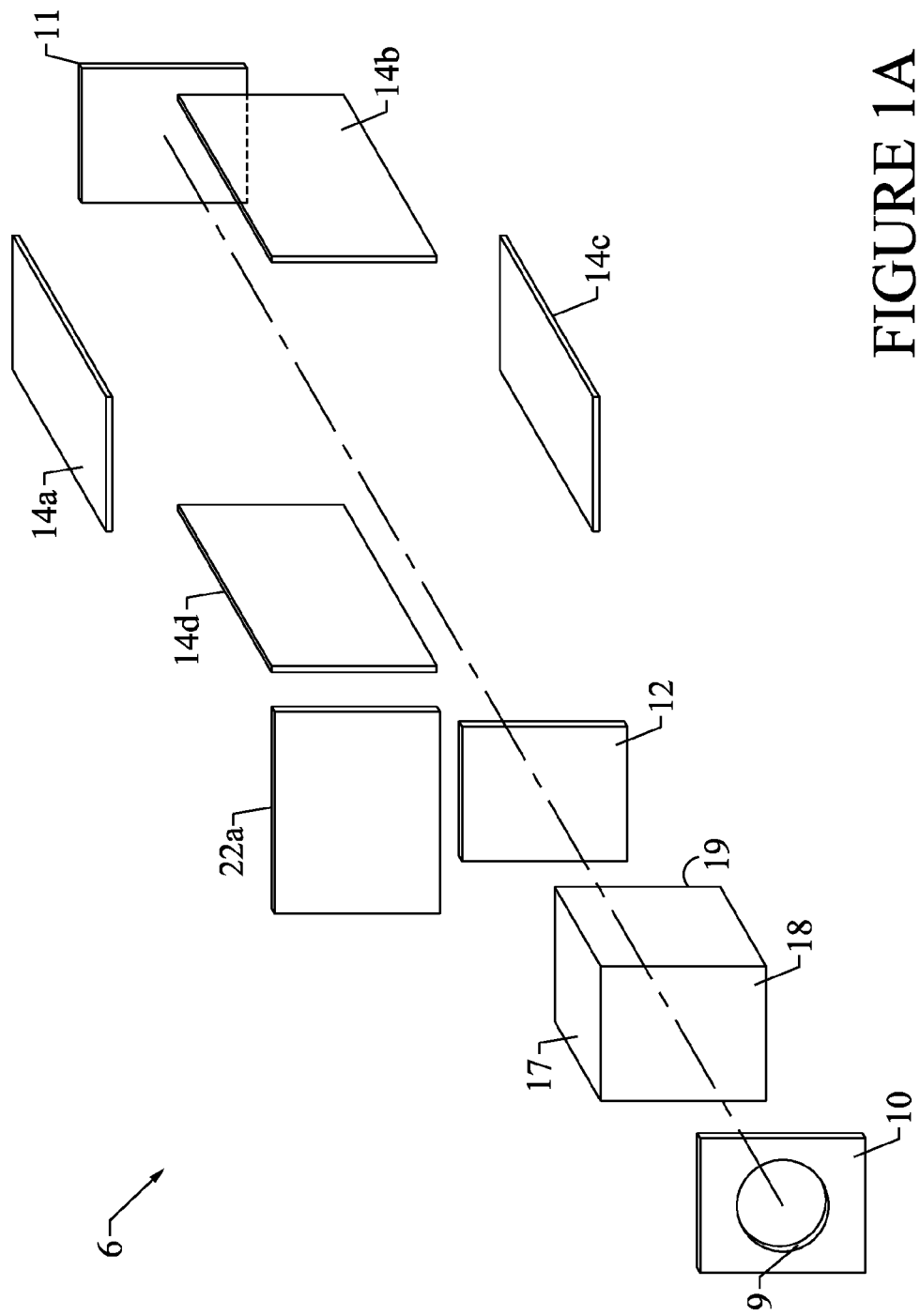

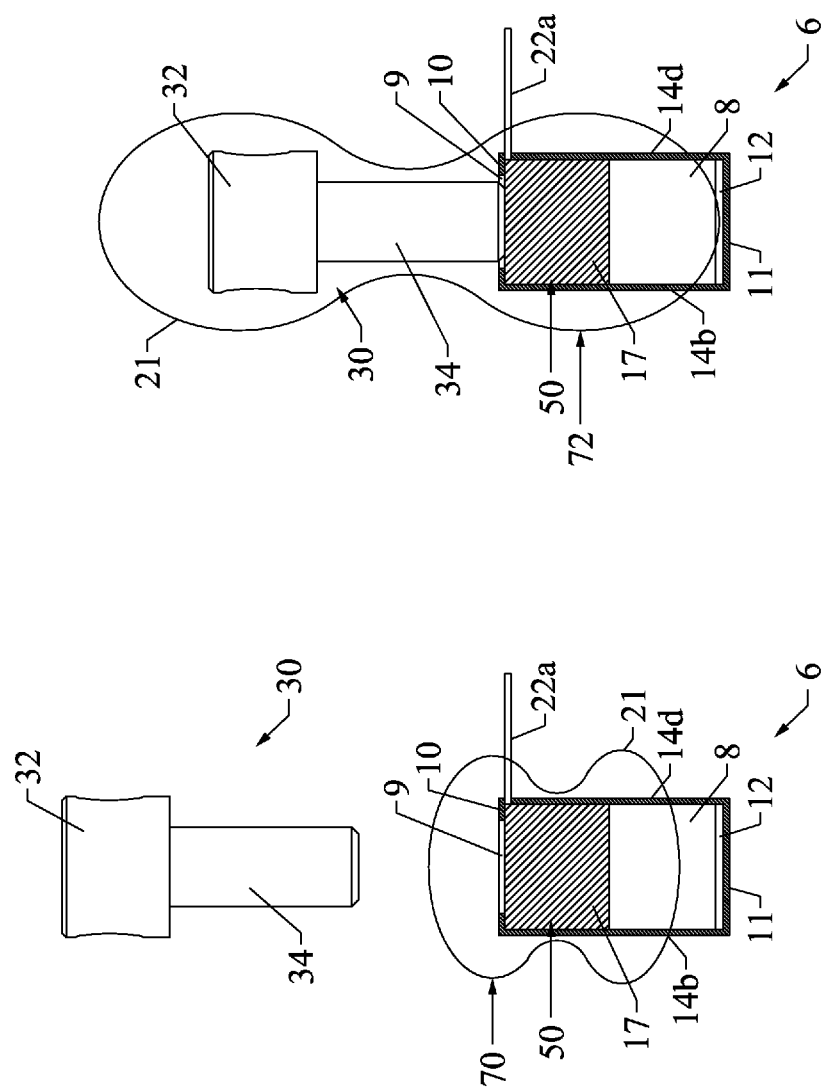

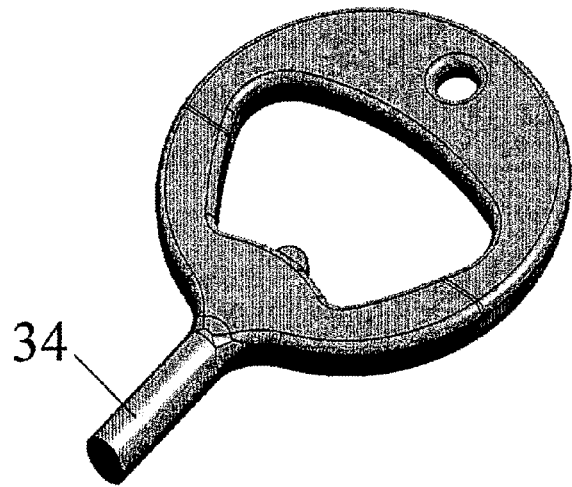
FIGURE 5E
FIGURE 5F
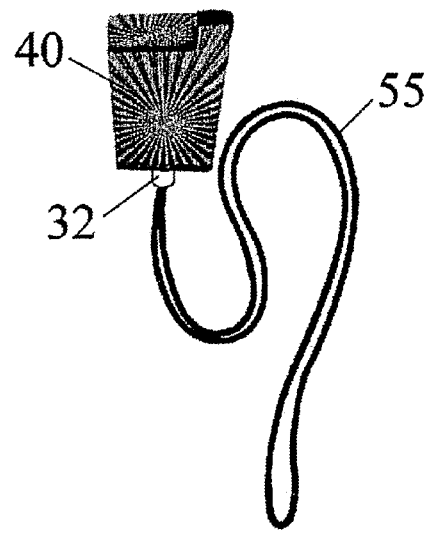

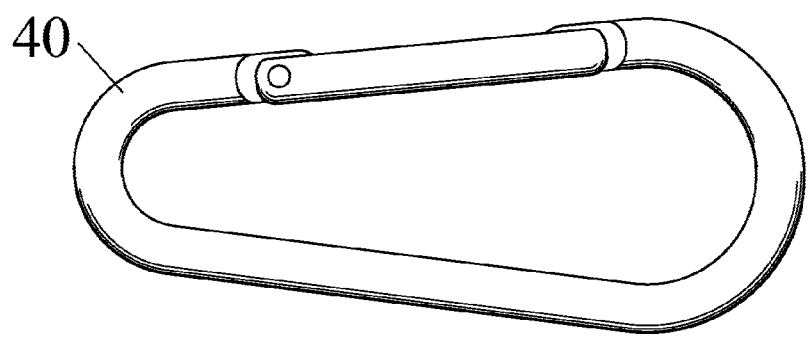
FIGURE 5G
FIGURE 5H
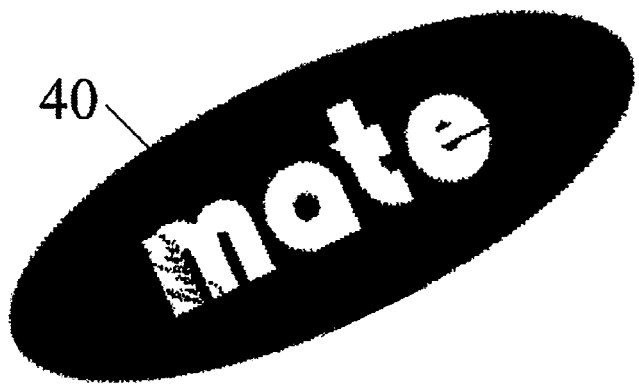

KITS FOR QUICK ATTACHING AND DISCONNECTING AN ITEM

CROSS REFERENCE TO RELATED APPLICATIONS

The present application is a continuation application claims priority and the benefit of co-pending International Patent Application No. PCT/US2009/059575 filed on Oct. 5, 2009, entitled "KIT FOR QUICK ATTACHING AND DISCONNECTING AN ITEM," which claims priority to U.S. Provisional Patent Application Ser. No. 61/103,906 filed on Oct. 8, 2008; entitled "KIT FOR QUICK ATTACHING AND DISCONNECTING AN ITEM." These references are hereby incorporated in their entirety.

FIELD

The present embodiments generally relate to a kit for enabling one or more items to be quickly attached or detached using an assembly with a magnet for providing a magnetic attraction strong enough to movably hold the magnet adjacent a first outer plate for a quick connect and disconnect.

BACKGROUND

Items that are small and compact in size are usually lost or misplaced. Once lost or misplaced, these items are not easily found and are usually replaced to avoid the consumer's time spent on trying to relocate these items.

A need exists for a kit and assembly which enables multiple items to connect and then quickly disconnect to provide an easy and efficient way for attaching and detaching items while carrying them.

A further need exists for a kit and assembly to avoid having to spend time looking for lost or misplaced items and is cost efficient in not having to replace these items.

The present embodiments meet these needs.

BRIEF DESCRIPTION OF THE DRAWINGS

The detailed description will be better understood in conjunction with the accompanying drawings as follows:

FIG. 1A is an isometric view of the assembly that is completely disassembled.

FIGS. 3A-3D are cut views of the assembly engaging an engagement pin.

FIGS. 5A-5H show the engagement pin usable with the interchangeable accessory item.

The present embodiments are detailed below with reference to the listed Figure.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to kits which comprise an assembly and accessory for attaching and detaching an item with a magnet for providing a magnetic attraction strong enough to movably hold the magnet adjacent a first outer plate.

The kit further relates to an easy way of carrying items that naturally would need to be kept together, such as a cigarette pack and a lighter, to be held together magnetically, in a secure fashion.

The embodiments can also include using security tags, such as "RFID's" or radio frequency identification tags and chips, in association with the magnetic fastening means, in combination with keys or other devices.

Referring now to the Figures, FIG. 1A shows an isometric view of the quick disconnect assembly that is completely disassembled.

Figure 1B:
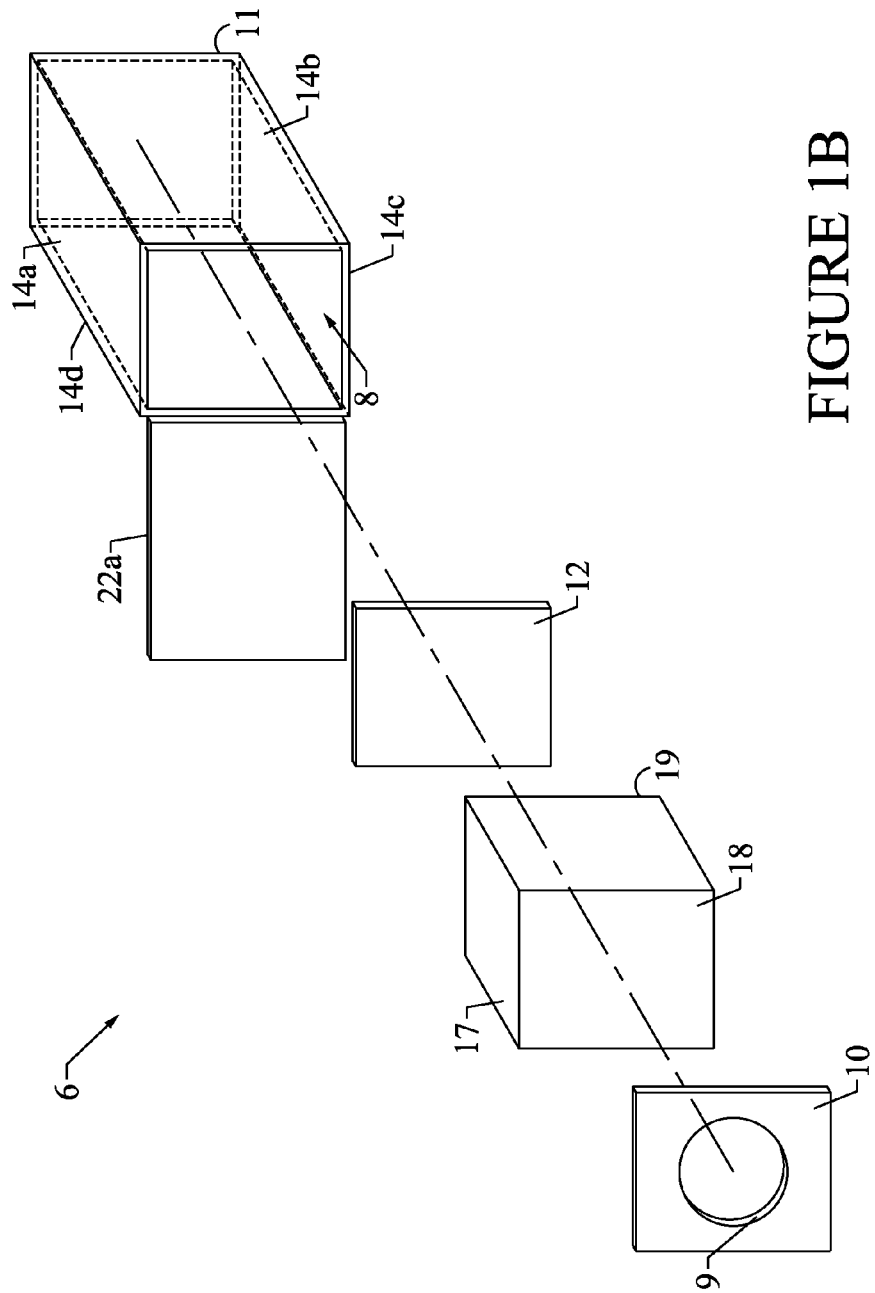
FIG. 1B is an isometric view of the assembly in which the assembly is partially assembled.

A quick disconnect assembly (6) for carrying a lightweight consumer item has a chamber (8), which can best be seen in FIG. 1B, having an opening (9) in a top wall (10).

The quick disconnect assembly (6) also has at least a bottom wall (11), opposite the top wall (10), and four side walls (14a-14d). In an embodiment it can be contemplated that there can be more than four side walls. In another embodiment it can be contemplated that there can be less than four side walls. In another embodiment, the side wall can be continuous and cylindrical in shape. It is also contemplated, that the side walls and the bottom wall can also be formed by a manufactured depression in an item.

The quick disconnect assembly (6) can have a magnetically attractable inner plate (12) fixed within the chamber (8) adjacent the bottom wall (11). The quick disconnect assembly (6) can also have a magnetically attractable outer plate (22a). The quick disconnect assembly (6) can also have a second outer plate (22b) disposed on a side wall opposite the outer plate.

The magnetically attractable outer plate (22a) can be secured to an end of the side wall (14d) opposite the magnetically attractable inner plate (12). The magnetically attractable outer plate (22a) can have a thickness and magnetic attraction strong enough to hold a magnet (17) adjacent the magnetically attractable outer plate (22a). It can be contemplated that more than one magnetically attractable outer plate can be used in the quick disconnect assembly (6). It is also contemplated that the magnetically attractable outer plate (22a) can be secured to any of the side walls.

In an embodiment, a side wall can have at least a right side wall with a right side wall top and a left side wall with a left side wall top.

The magnet (17) can have a first magnet flat side (18) and a second magnet flat side (19) opposite the first magnet flat side, wherein the magnet can be slidably disposed in the chamber (8) for moving between top wall (10) and the magnetically attractable inner plate (12).

In an embodiment, the magnet can be a cylindrical-shaped magnet, a cube-shaped magnet, or another geometrical shaped magnet. The geometrical shape can depend on the manufacturing of an item.

In another embodiment, the magnet can be a solid magnet and all sides of the magnet can be magnetic. The magnet can further be a rare earth metal magnet.

In this embodiment, rare earth metals can be such as neodymium iron boron magnet graded in strength from N24 to N54 which is a permanent magnet and further can include the following four classes: Neodymium Iron Boron (NdFeB or NIB), Samarium Cobalt (SmCo), Alnico, Ceramic or Ferrite.

Additional magnets can be used, as there are 3 main types of magnets: Permanent Magnets, Temporary Magnets, and Electromagnets.

FIG. 1B shows an isometric view of the quick disconnect assembly in which the quick disconnect assembly is shown partially assembled. The side walls (14a-14d) and the bottom wall (11) are shown connected with one another to form the chamber (8). The magnetically attractable outer plate (22a) can be secured to an end of the side wall (14d) opposite the magnetically attractable inner plate (12).

In an embodiment the chamber can be round or polygon in shape.

Figure 1C:
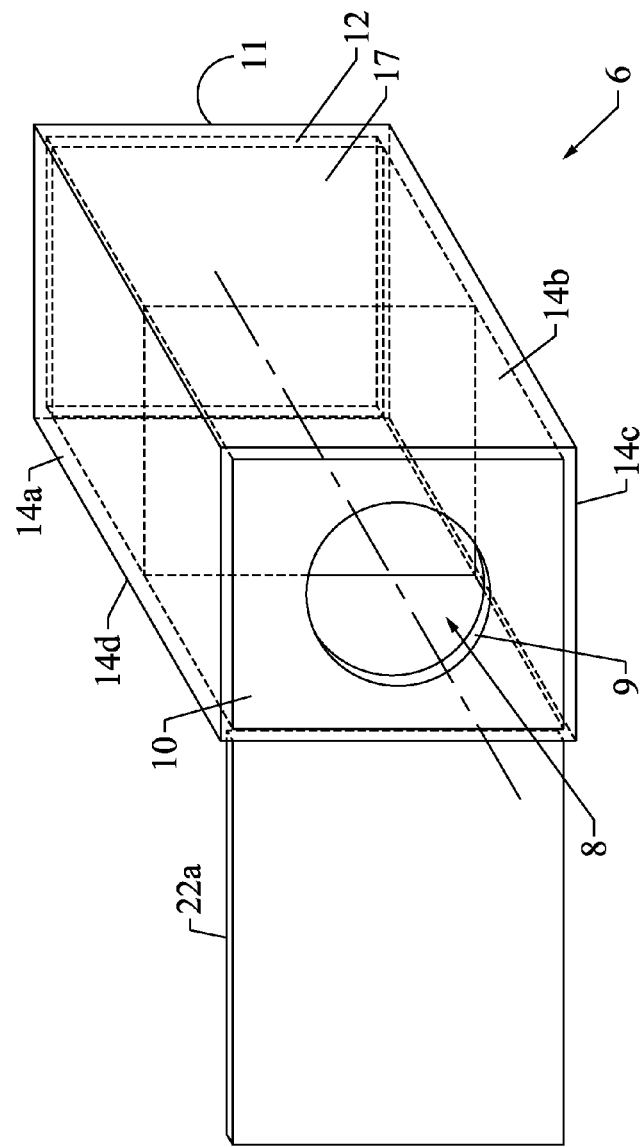
FIG. 1C is an isometric view of the assembly that is fully assembled.

FIG. 1C shows an isometric view of the quick disconnect assembly that is fully assembled. The magnetically attractable inner plate (12) can be attached to the bottom wall (11) inside the chamber (8). The magnet (17) can be slidably disposed in the chamber (8) for moving between top wall (10) and the magnetically attractable inner plate (12). The top wall (10), having an opening (9), can be attached to the side walls (14a-14d) opposite the bottom wall (11).

Figure 2:
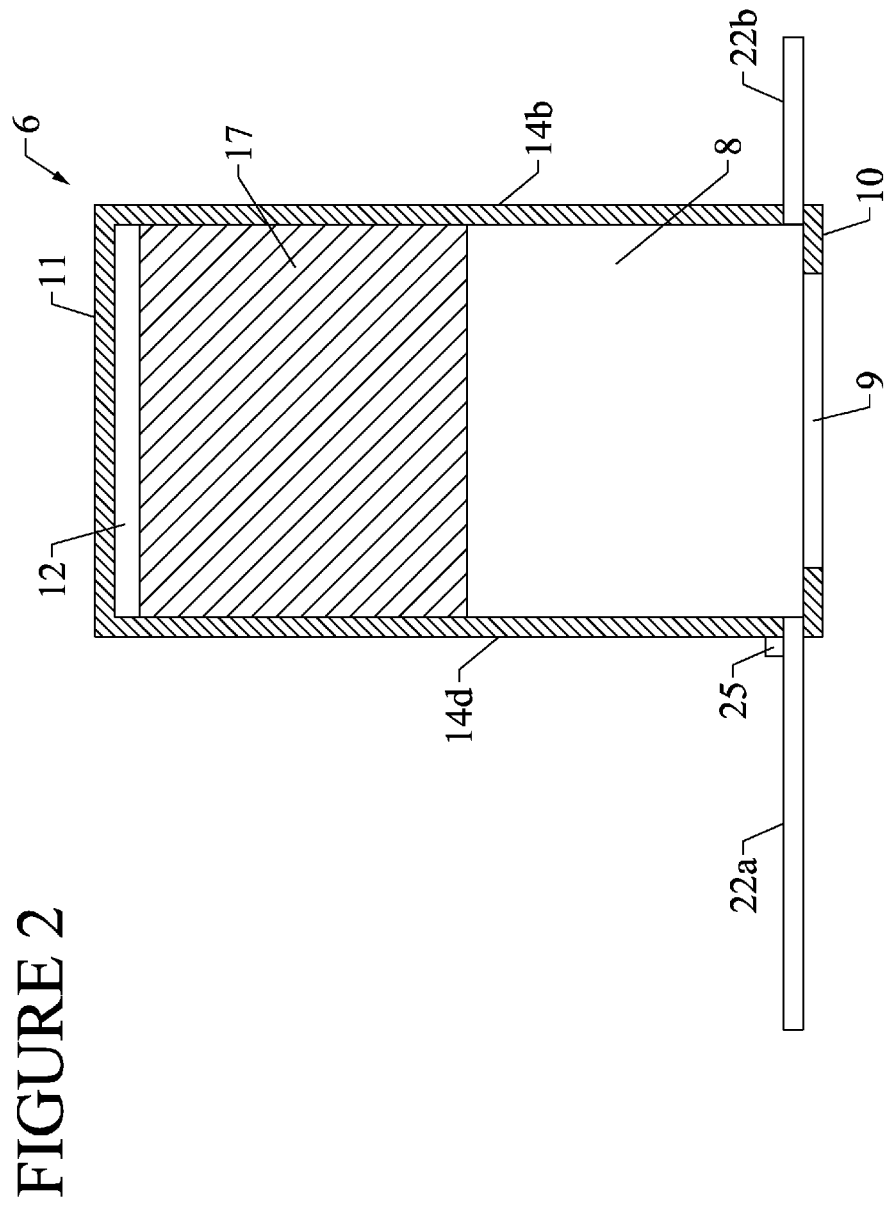
FIG. 2 is a cut view of the assembly.

FIG. 2 shows a cut view of the quick disconnect assembly. The cut view shows the quick disconnect assembly cut through two of the side walls (14b and 14d). The cut view also shows the top wall (10) and bottom wall (11) opposite each other.

The magnetically attractable outer plate (22a) can be secured to a side wall using a fastening means (25).

In an embodiment, the fastening means can extend through the magnetically attractable outer plate and into the side wall. The fastening means can be an adhesive, a fastener, such as a screw or pin, an epoxy, other bonding materials, or combinations thereof.

An item can be a lighter, a flashlight, a keychain, a MP3 player, an Ipod, a cell phone, a camera, a video recorder, a wallet, a cigarette case, eyeglass cases, eyeglasses, sunglasses, horse bridals, wake boards, ski boots, or items of the like.

The magnetically attractable inner plate (12) can be attached to the bottom wall (11) inside the chamber (8).

The magnet (17) is shown slidably disposed in the chamber (8) for moving between top wall (10) and the magnetically attractable inner plate (12).

A portion of the opening (9) is also shown in the top wall (10).

FIG. 3A shows a cut view of the quick disconnect assembly. The cut view shows the quick disconnect assembly cut through two of the side walls (14b and 14d). The cut view also shows the top wall (10) and bottom wall (11) opposite each other.

The magnetically attractable inner plate (12) is shown attached to the bottom wall (11) inside the chamber (8).

The magnet (17) is shown slidably disposed in the chamber (8) in a first position (50) adjacent to the top wall (10). The magnet (17) can be held in the first position (50) by the magnet's magnetic attraction to the magnetically attractable outer plate (22a).

FIG. 3A also shows a magnetic field (21), with a first magnetic field size (70), in a position that is attracted to the magnetically attractable outer plate (22a).

An engagement pin (30) with a pin head (32) and a pin stem (34) is shown in a position outside the magnetic field produced by the magnet (17). The engagement pin's (30) pin stem (34) has a diameter small enough to slidably move inside the chamber through the opening (9) in the top wall (10). The pin stem comprises a magnetically attractable material capable of moving the magnet (17).

In an embodiment, the pin stem can be cylindrical, conical, or polygonal with at least one pin stem flat face for engaging the first magnet flat side.

In an embodiment the pin stem and the pin head can be a two piece unit that can be made of a ferromagnetic material, such as steel, which can further be removably attachable to each other by threading, epoxy, bonding, welding, clamping, snapping, bolting, or other fastening means. In an additional embodiment the pin stem and the pin head can be a one piece unit that can be made of a ferromagnetic material. Additional magnetic materials can be used, such as iron and steel.

FIG. 3B shows a cut view of the quick disconnect assembly. The cut view shows the quick disconnect assembly cut through two of the side walls (14b and 14d). The cut view also shows the top wall (10) and bottom wall (11) opposite each other.

The magnetically attractable inner plate (12) is shown attached to the bottom wall (11) inside the chamber (8).

The engagement pin (30) with a pin head (32) and a pin stem (34) is shown in a magnetically attached position with the magnet (17). Once the engagement pin (30) is in a magnetically attached position with the magnet (17), the magnetic field (21) can change shape to a second magnetic field size (72).

The new shape of the magnetic field (21) changes the strength of the magnet's magnetic attraction to the magnetically attractable inner plate (12), and the magnet (17) moves to a second position (52) adjacent to the magnetically attractable inner plate (12) which can best be seen in FIG. 1C.

Figure 3C:
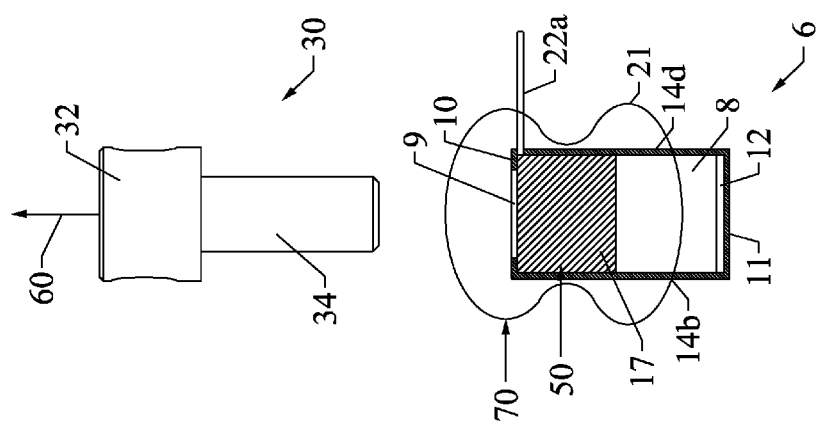

FIG. 3C shows a cut view of the quick disconnect assembly. The cut view shows the quick disconnect assembly cut through two of the side walls (14b and 14d). The cut view also shows the top wall (10) and bottom wall (11) opposite each other.

The magnetically attractable inner plate (12) is shown attached to the bottom wall (11) inside the chamber (8).

The engagement pin's pin stem (34) is shown slidably disposed in the chamber (8), through opening (9) in the top wall (10), in a magnetically attracted position attached to the magnet (17).

The pin head can have a diameter larger than the pin stem and can be made from the same material as the pin stem. In another embodiment, the pin stem and pin head can be made of different materials. Such materials can include but are not limited to plastics, metals, metal alloys, polymers, and wood for example.

The magnet (17) is shown slidably disposed in the chamber (8) in a second position (52) adjacent to the magnetically attractable inner plate (12). The magnet (17) is held in the second position (52) by the magnet's magnetic attraction to the magnetically attractable inner plate (12).

Figure 3D:
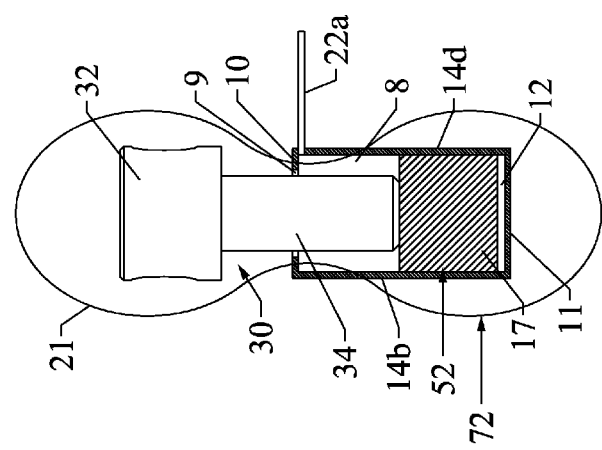
Figure 4A:
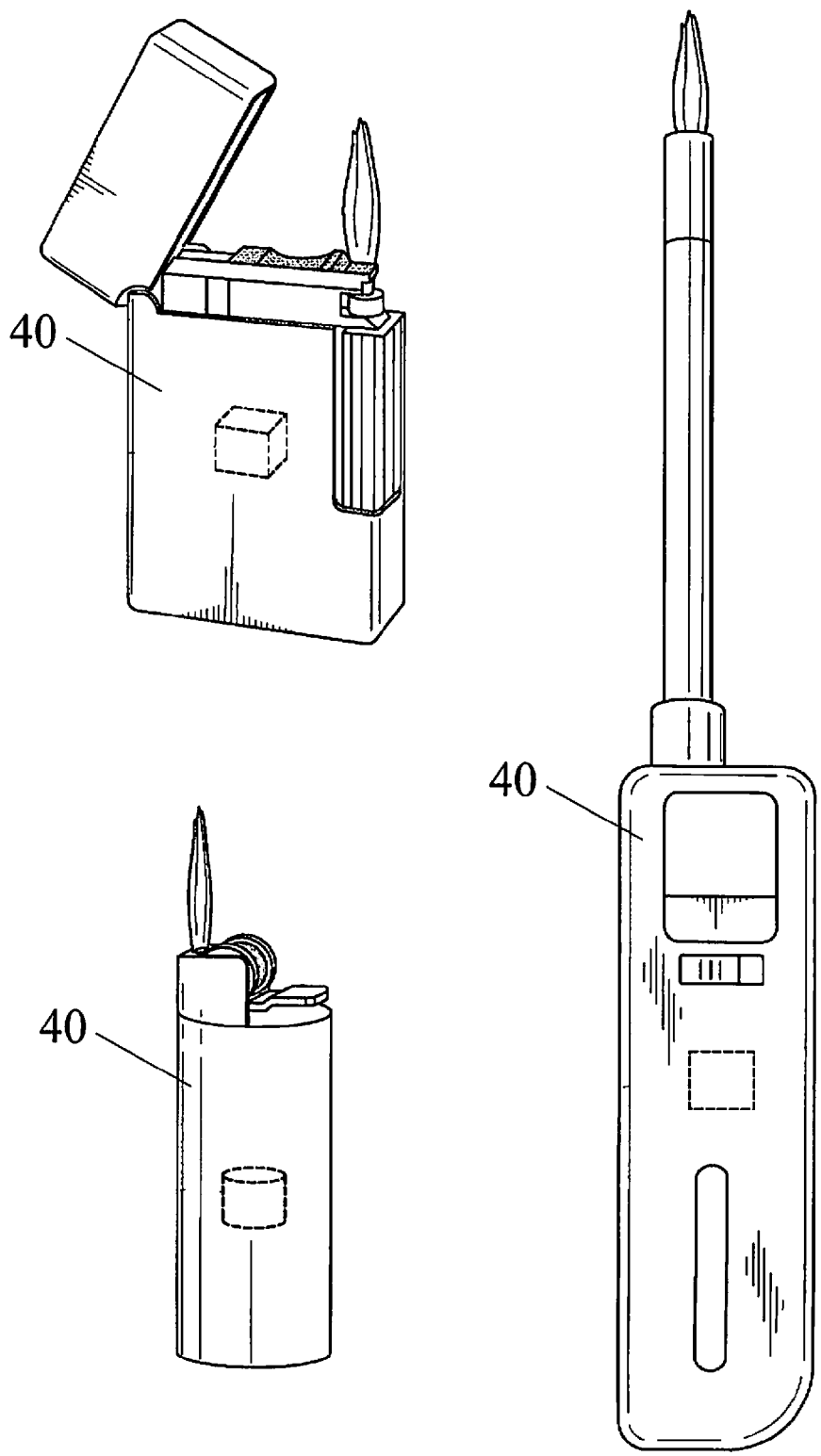
FIGS. 4A-4F show items being used with the assembly.
Figure 4B:
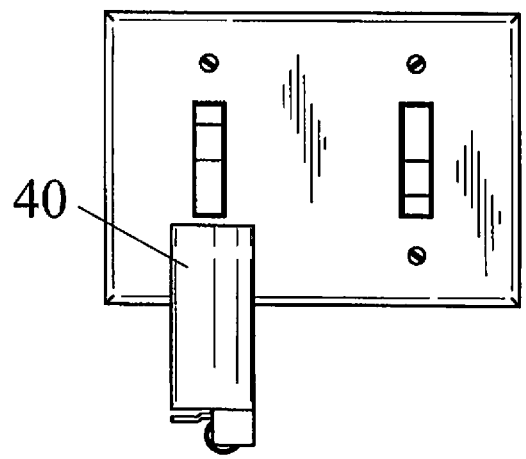
Figure 4B:
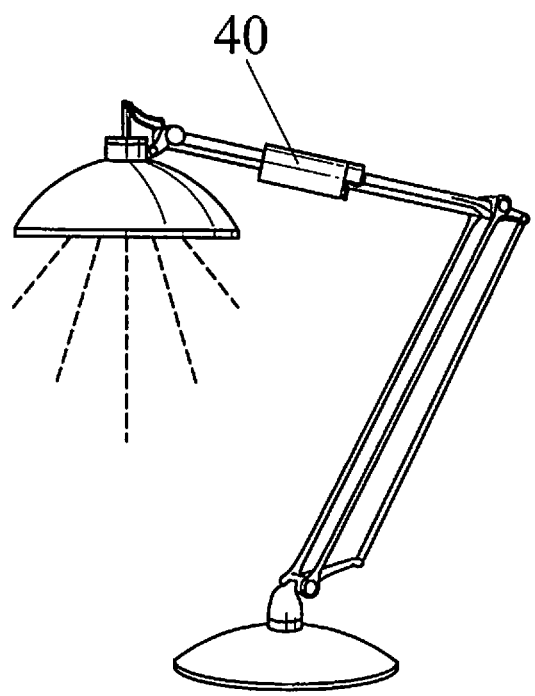
Figure 4C:
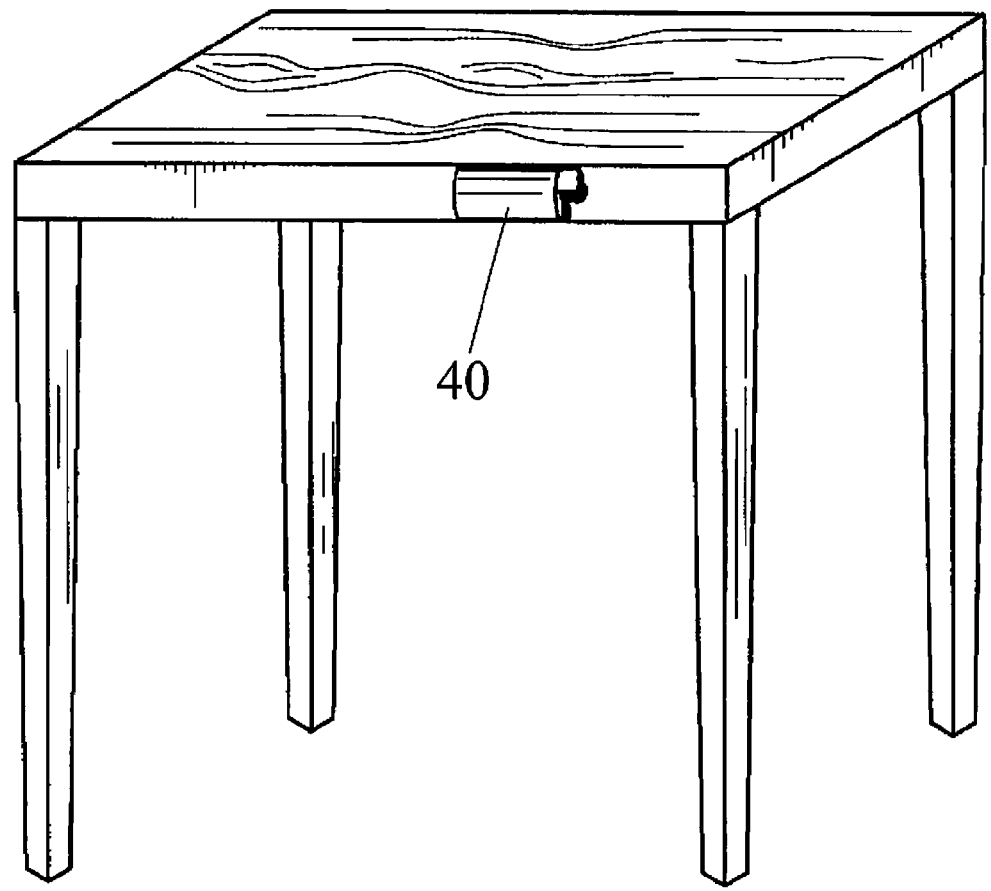
Figure 4D:
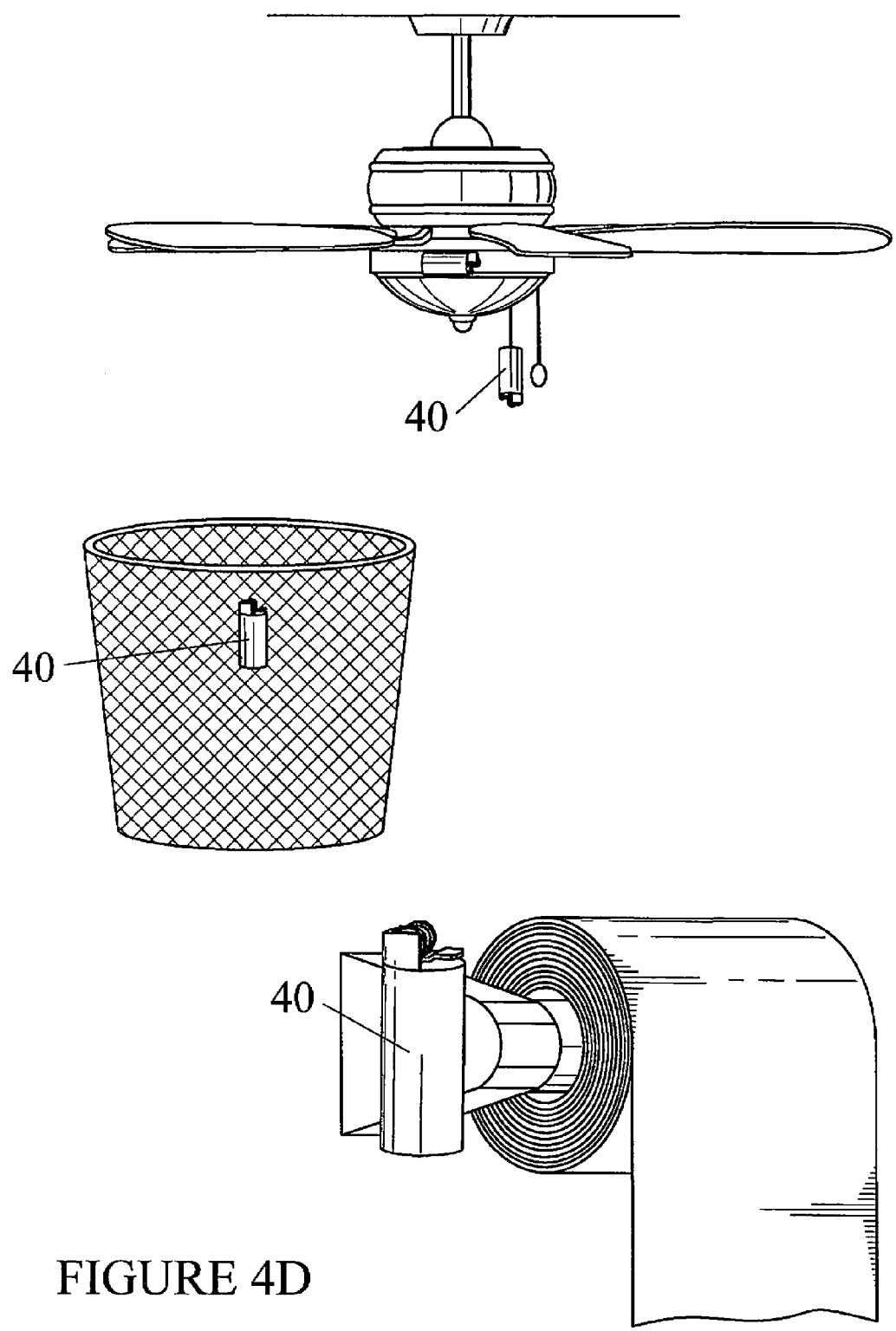
Figure 4E:
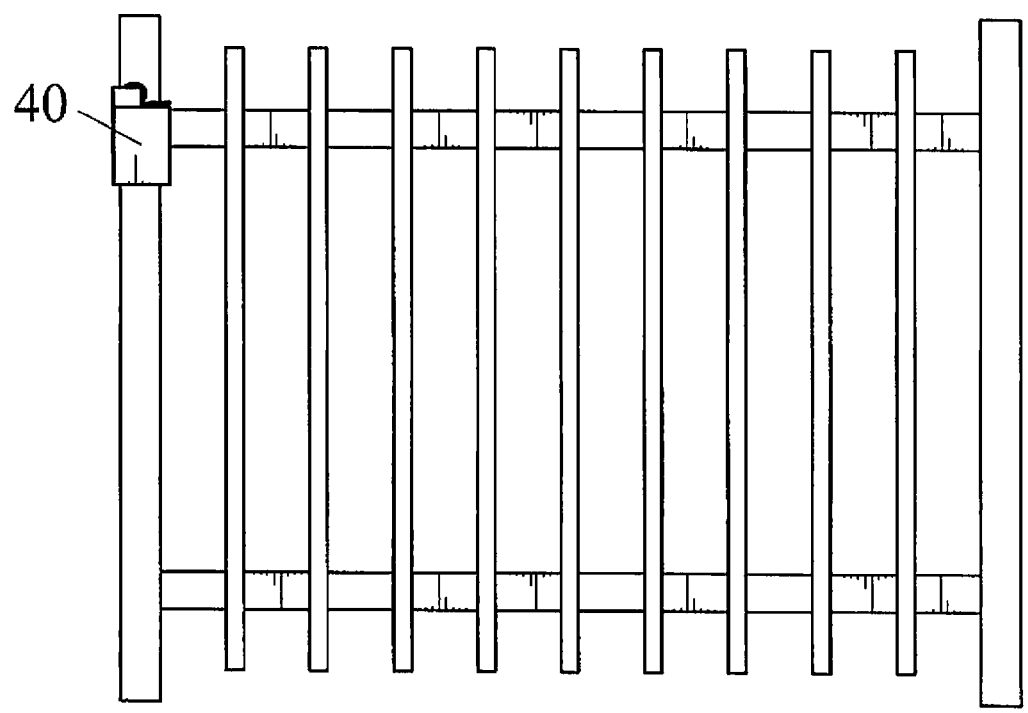
Figure 4E:
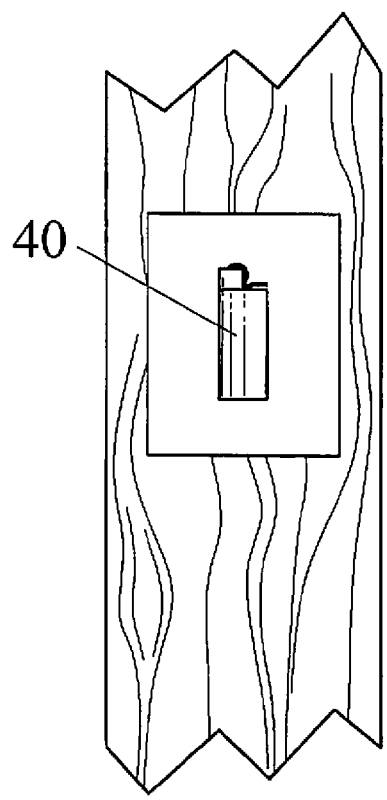
Figure 4F:
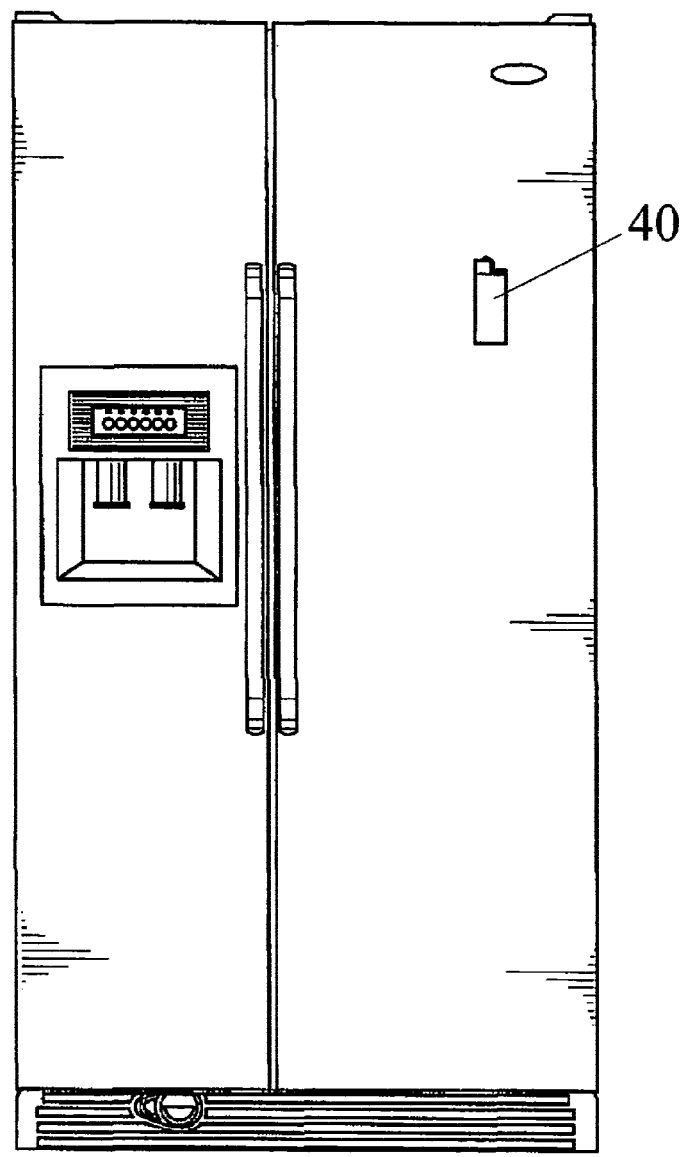
Figure 5A:
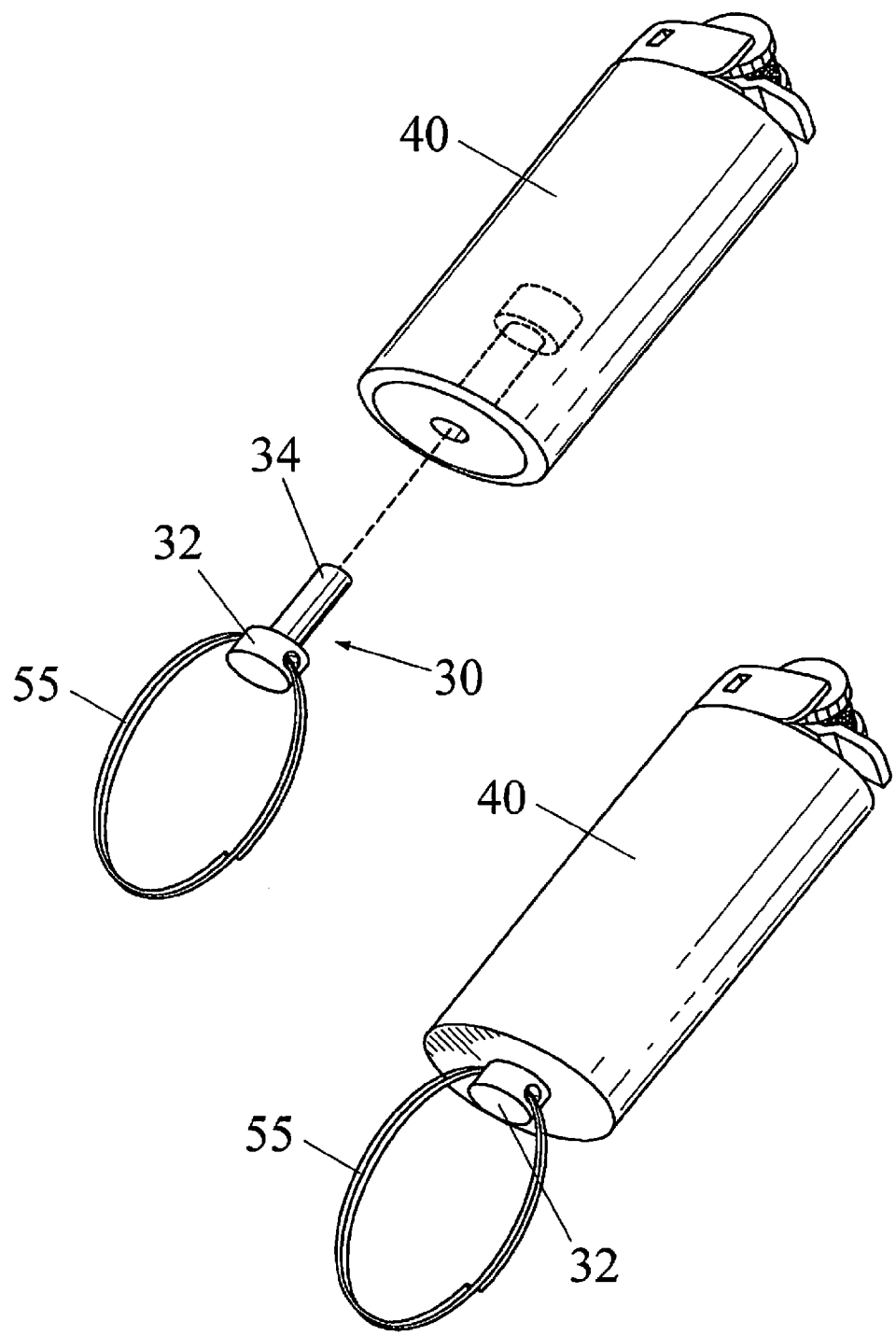
Figure 5B:
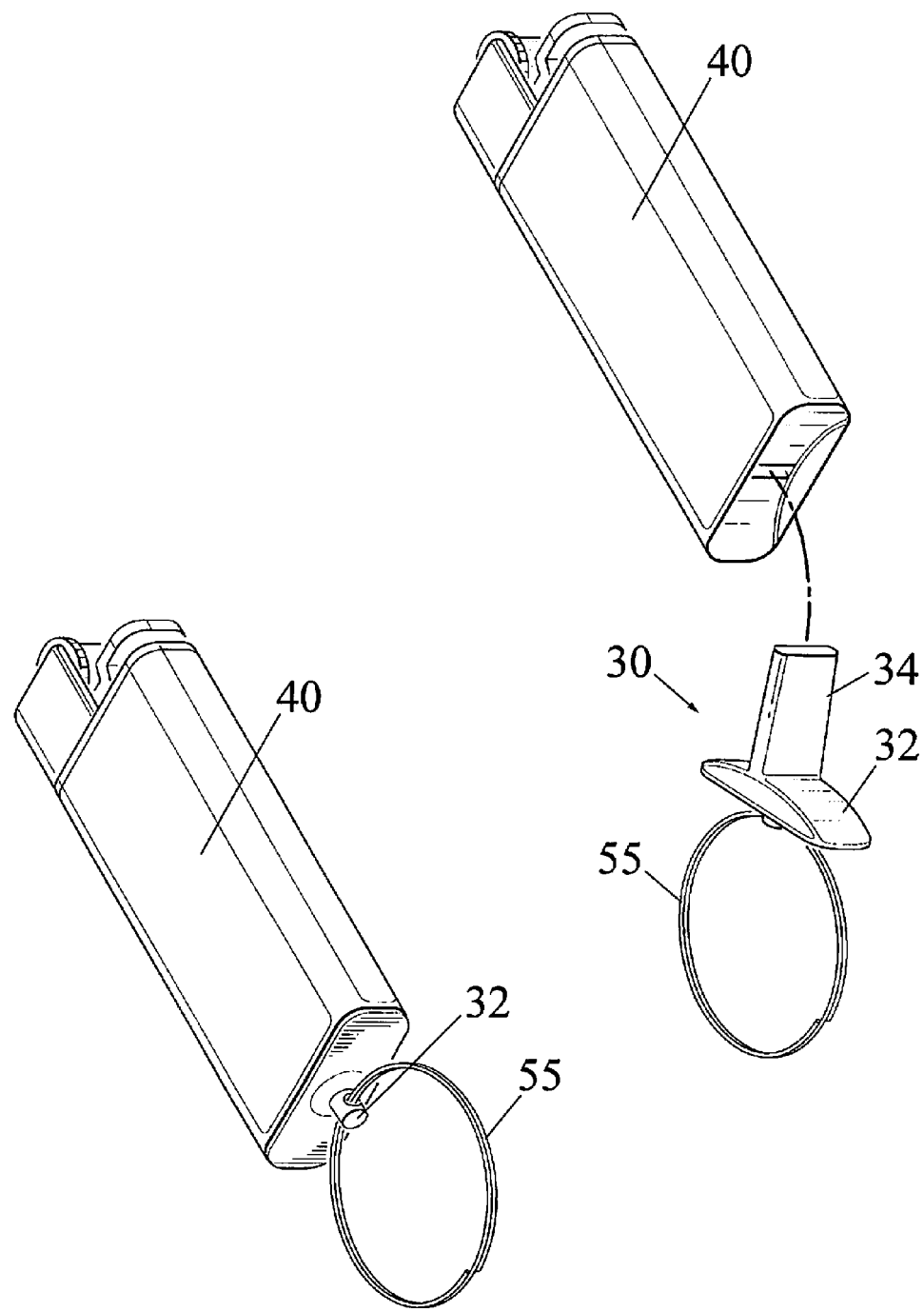
Figure 5C:
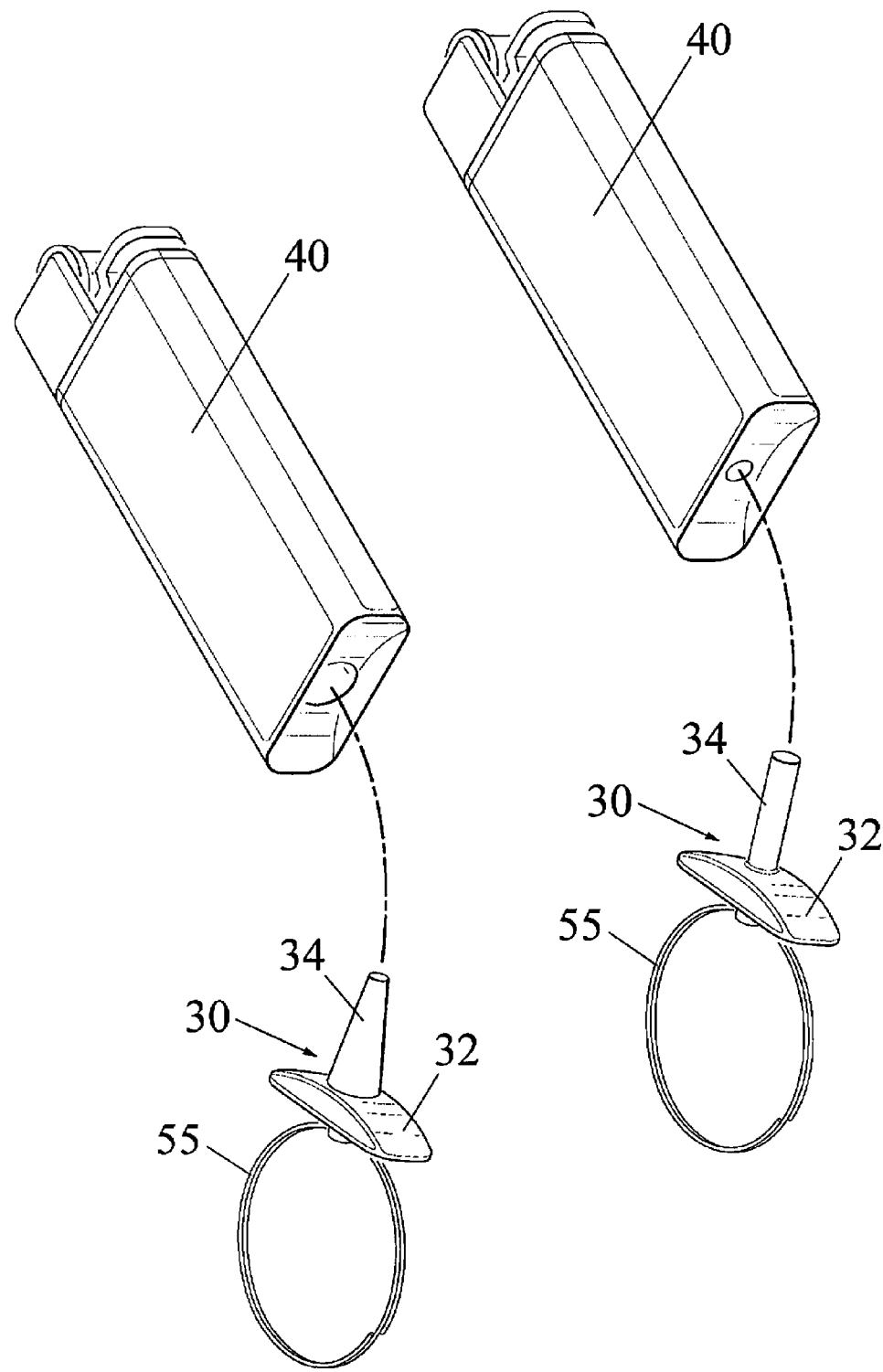
Figure 5D:
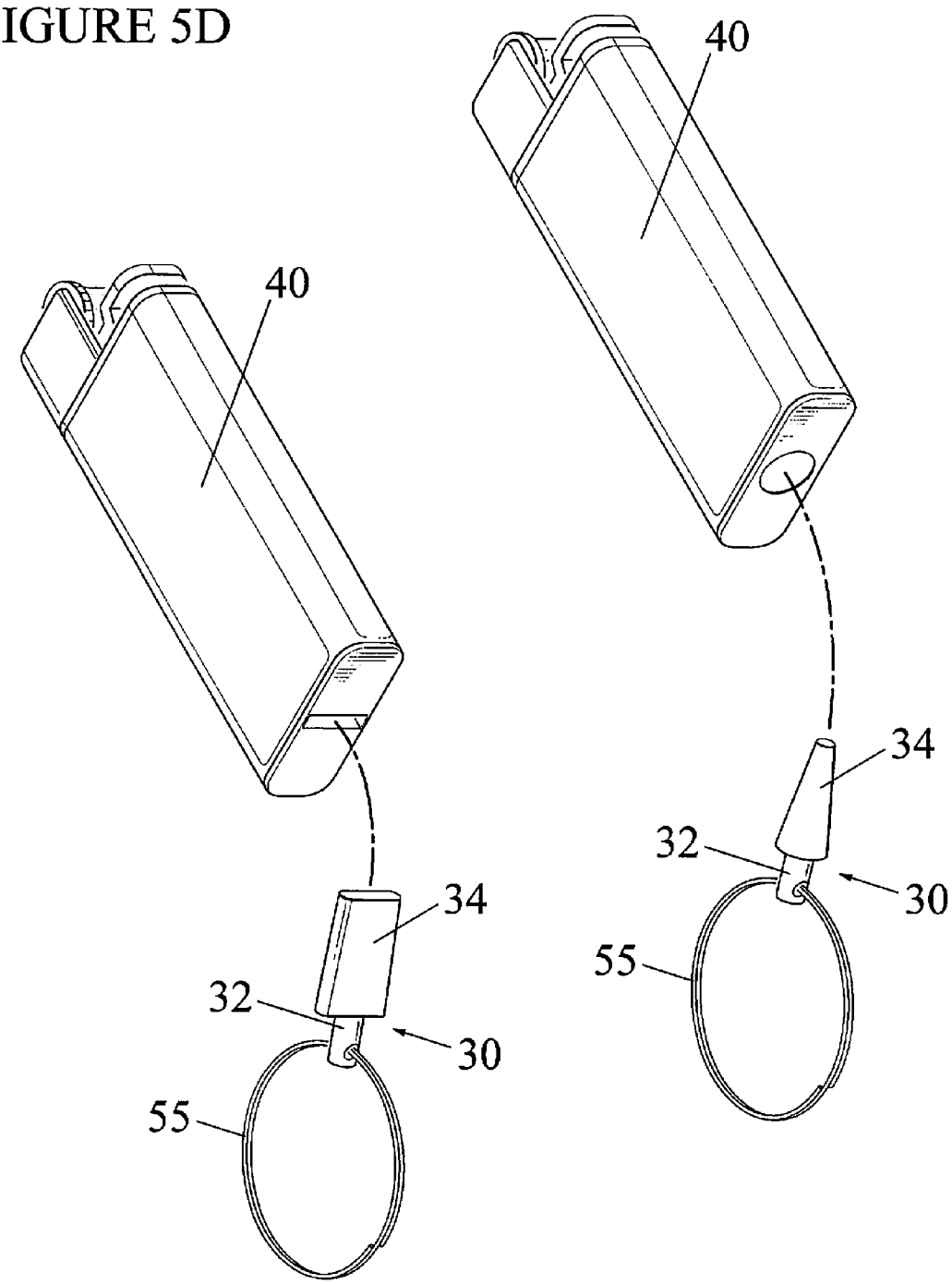

FIG. 3D shows a cut view of the assembly. The cut view shows the quick disconnect assembly cut through two of the side walls (14b and 14d). The cut view also shows the top wall (10) and bottom wall (11) opposite each other.

The magnetically attractable inner plate (12) is shown attached to the bottom wall (11) inside the chamber (8).

When a force (60) pulls the engagement pin (30) with enough force to break the magnetic attraction between the magnet (17) and the magnetically attractable inner plate (12), the magnet (17) can then slide through the chamber until it makes contact with the top wall (10).

If the force (60) is still strong enough to break the magnetic attraction between the magnet (17) and the engagement pin (30), then the engagement pin's (30) pin stem (34) can exit the chamber (8) through the opening (9) in the top wall (10).

Once the engagement pin (30) has been removed from the magnetically attracted position attached to the magnet (17) the magnetic field (21) changes shape back to its first magnetic field size (70), and the magnet (17) can once again be held in the first position (50) by the magnets (17) magnetic attraction to the magnetically attractable outer plate (22a).

FIG. 4A-4F shows items (40) usable with the assembly. The uses of the assembly are not limited to only these representations.

Kit with Pin and Accessory Item

In an embodiment, the kit for attaching and disconnecting an item comprises an assembly with an engagement pin comprising a pin head and a pin stem. The kit further comprises an interchangeable accessory item.

In an embodiment, the pin head and pin stem can be hollow. In other embodiments the pin stem can be solid and the pin head can be hollow. In a further embodiment, the pin head can have an adapter and in a further embodiment, the pin head can have an attachment.

The interchangeable accessory item can magnetically attach to the assembly using the magnet for a quick connect and disconnect. An interchangeable accessory item can be a key ring, a carabineer, a float key ring, a piece of jewelry, a bottle opener, a lanyard, a suction cup, a cigar punch and combinations thereof.

In this embodiment, fasteners can be used such as a multipurpose clasp, a jeans snap, a jeans clasp, a belt clip, a purse clip, a golf bag clip, and combinations thereof. The fasteners useable in this embodiment can further comprise an engagement pin to magnetically attach to the assembly using the magnet for a quick connect and disconnect.

One or more interchangeable accessory items can be attached to the assembly at one time, in this embodiment.

FIGS. 5A-5H show the engagement pin (30) being used with the interchangeable accessory item (55) connected to the item (40). These Figures further show the engagement pin's pin head (32) and pin stem (34) in various positions of use with the item (40).

Cigarette Plaque

In an embodiment, the kit for attaching and disconnecting an item comprises an assembly with a thin removable plate. The thin removable plate can be inserted into an item and can magnetically attach to the assembly using the magnet for a quick connect and disconnect to the assembly.

The thin removable plate (65) which can have a length between about 2.0 inches to about 6.0 inches and a thickness between about 0.25 inches to about 0.75 inches. The plate can be made from stainless steel or another magnetic material that can be attractable to the magnet. In an additional embodiment the plate can be perforated with holes having different diameters enabling engagement with different size clasps. In additional embodiments, the thin removable plate may have a coating disposed upon it.

In additional embodiments, the thin removable plate can be bigger or smaller than the dimensions as described above.

In another embodiment, the thin removable plate (65) which can have a length no greater than about 2.0 inches, a width no greater than about 2.0 inches and a thickness between about 0.125 inches to about 0.0625 inches for magnetically attracting to the magnet through at least one layer of material having a thickness no greater than 0.25 inches for attaching to a second item (45). The at least one layer of material can include, but is not limited to fabric, cellophane, plastic, paper, cardboard, vinyl, latex, combinations thereof.

Figure 6:
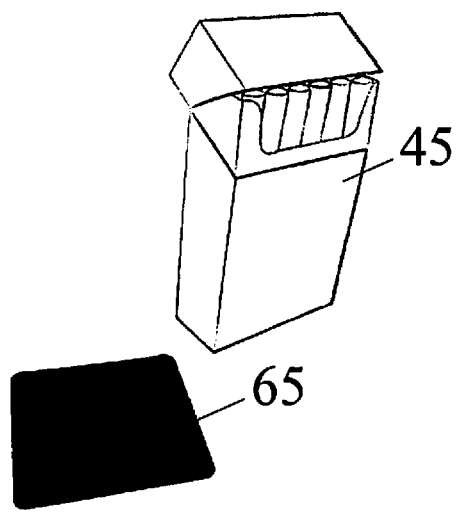
FIG. 6 shows an embodiment of the thin removable plate.
Figure 6:
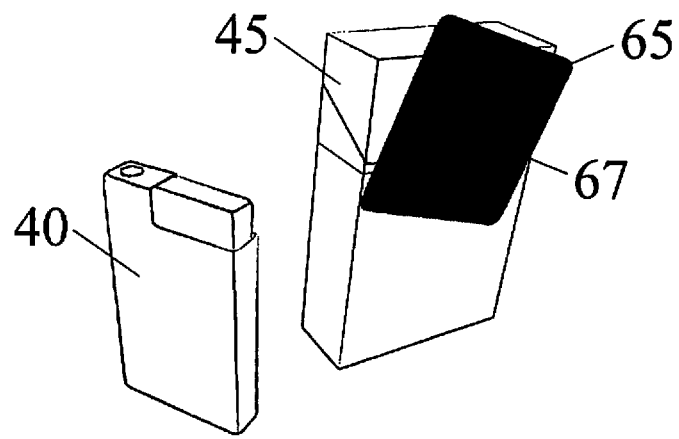
Figure 6:
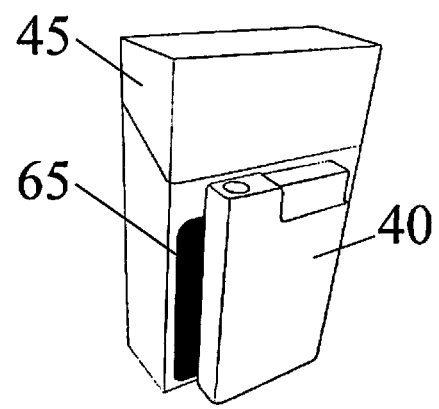
Figure 7A:
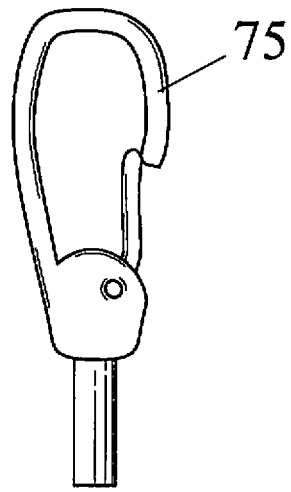
FIGS. 7A-7G show embodiments of the fastening means.
Figure 7A:
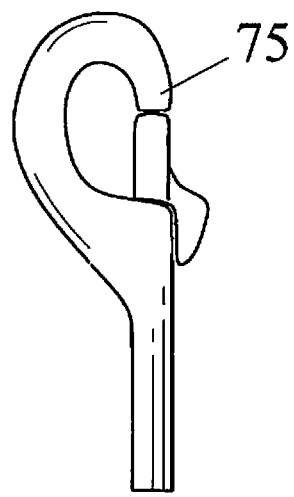
Figure 7A:
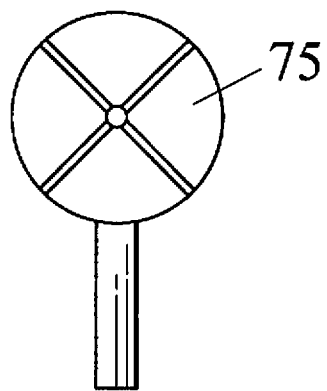
Figure 7A:
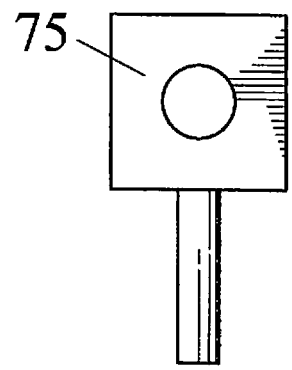
Figure 7B:
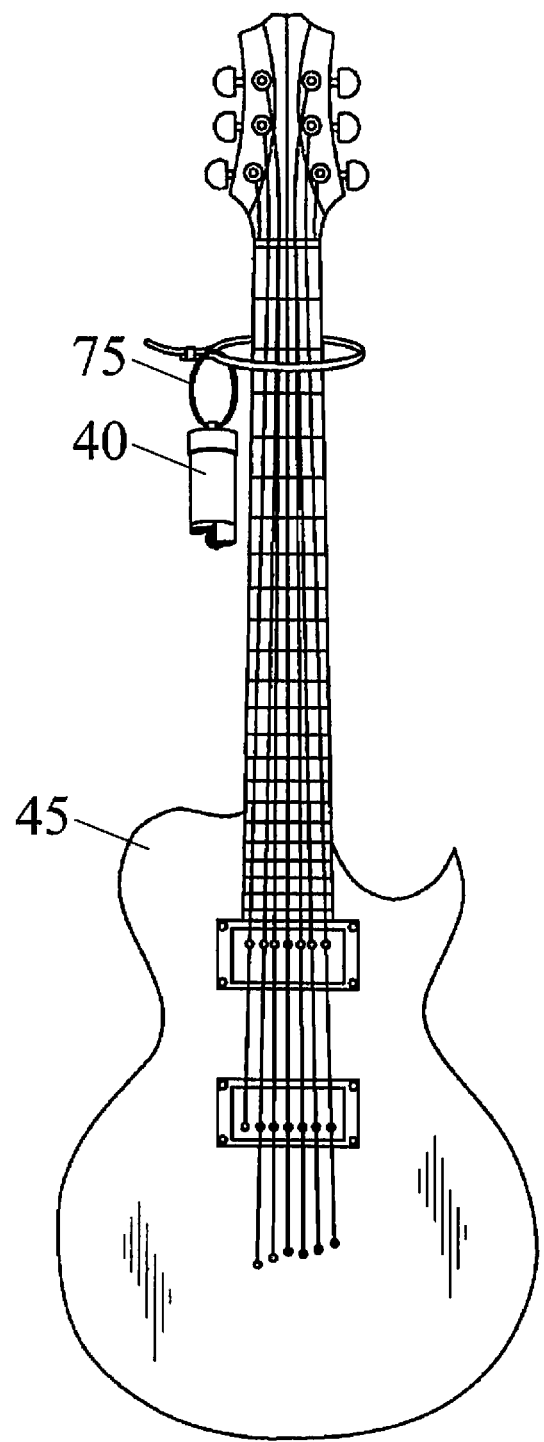
Figure 7C:
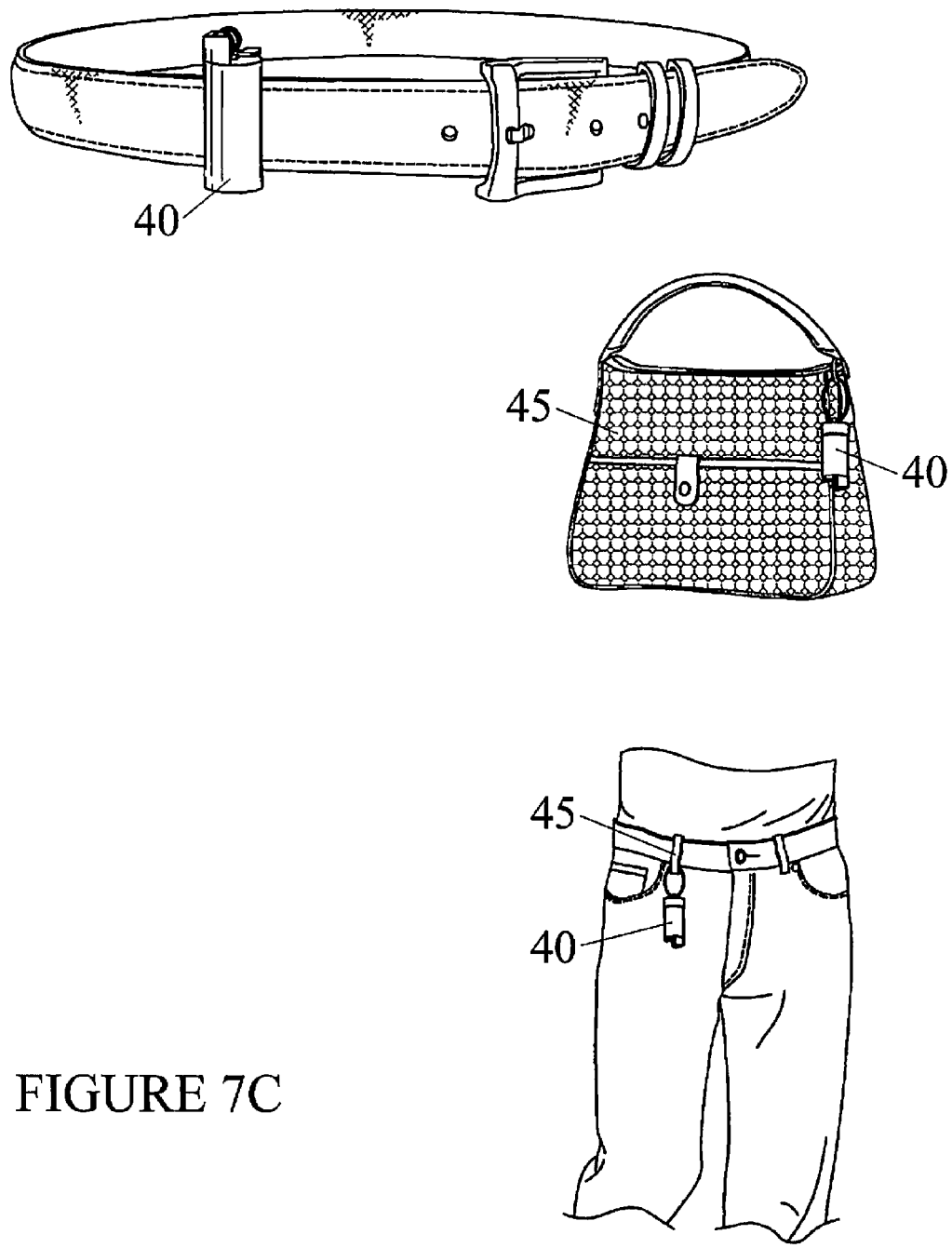
Figure 7D:
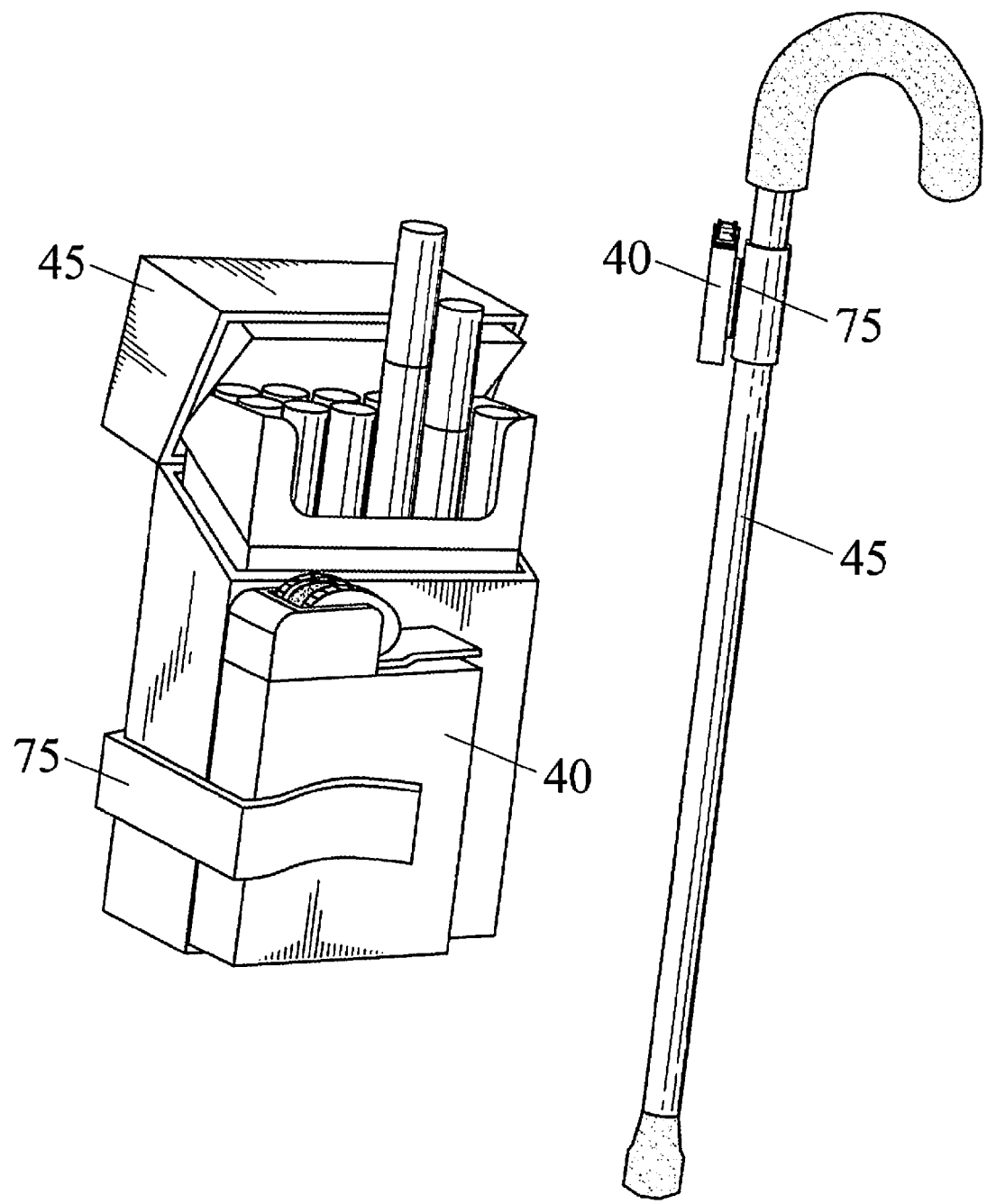
Figure 7E:
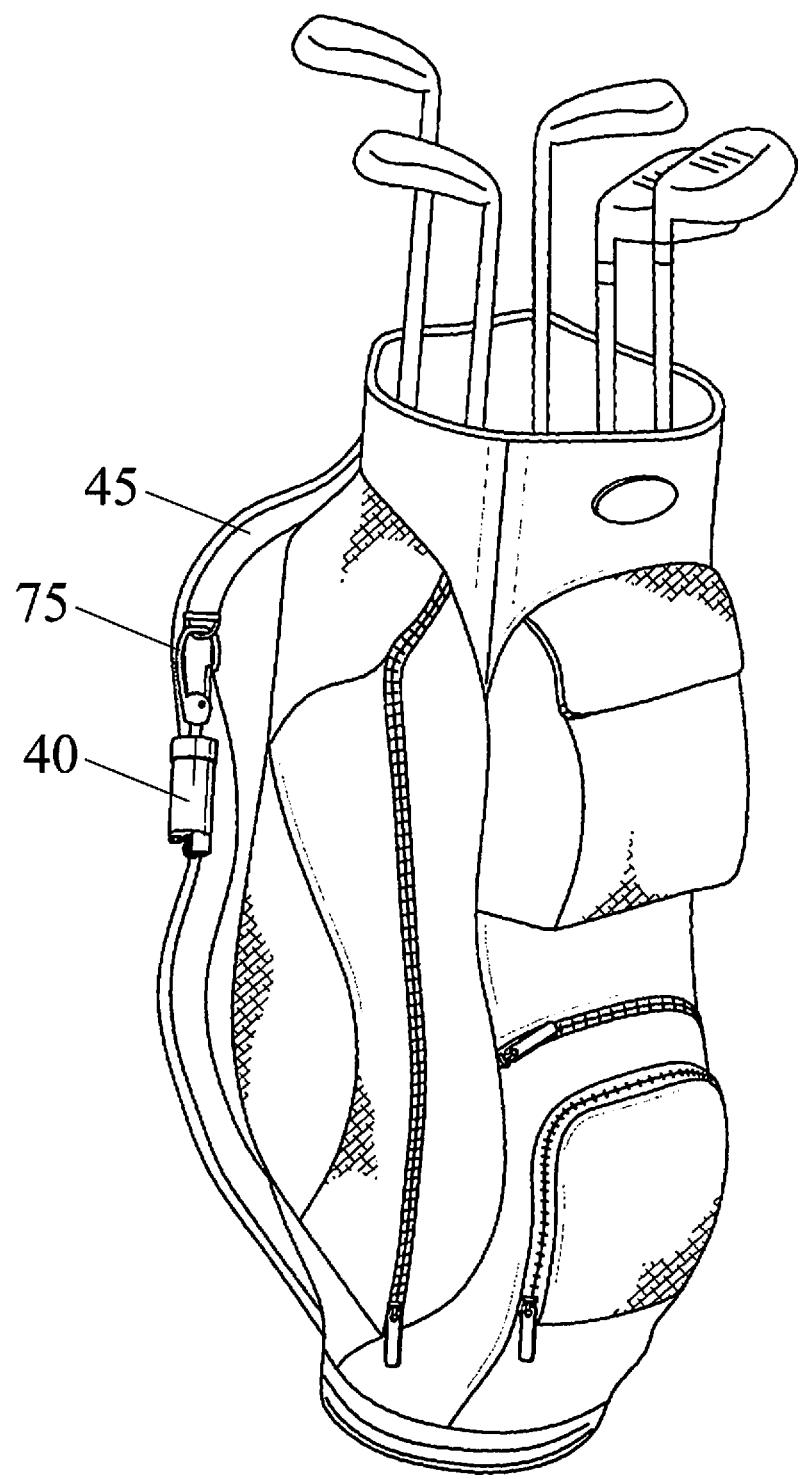
Figure 7F:
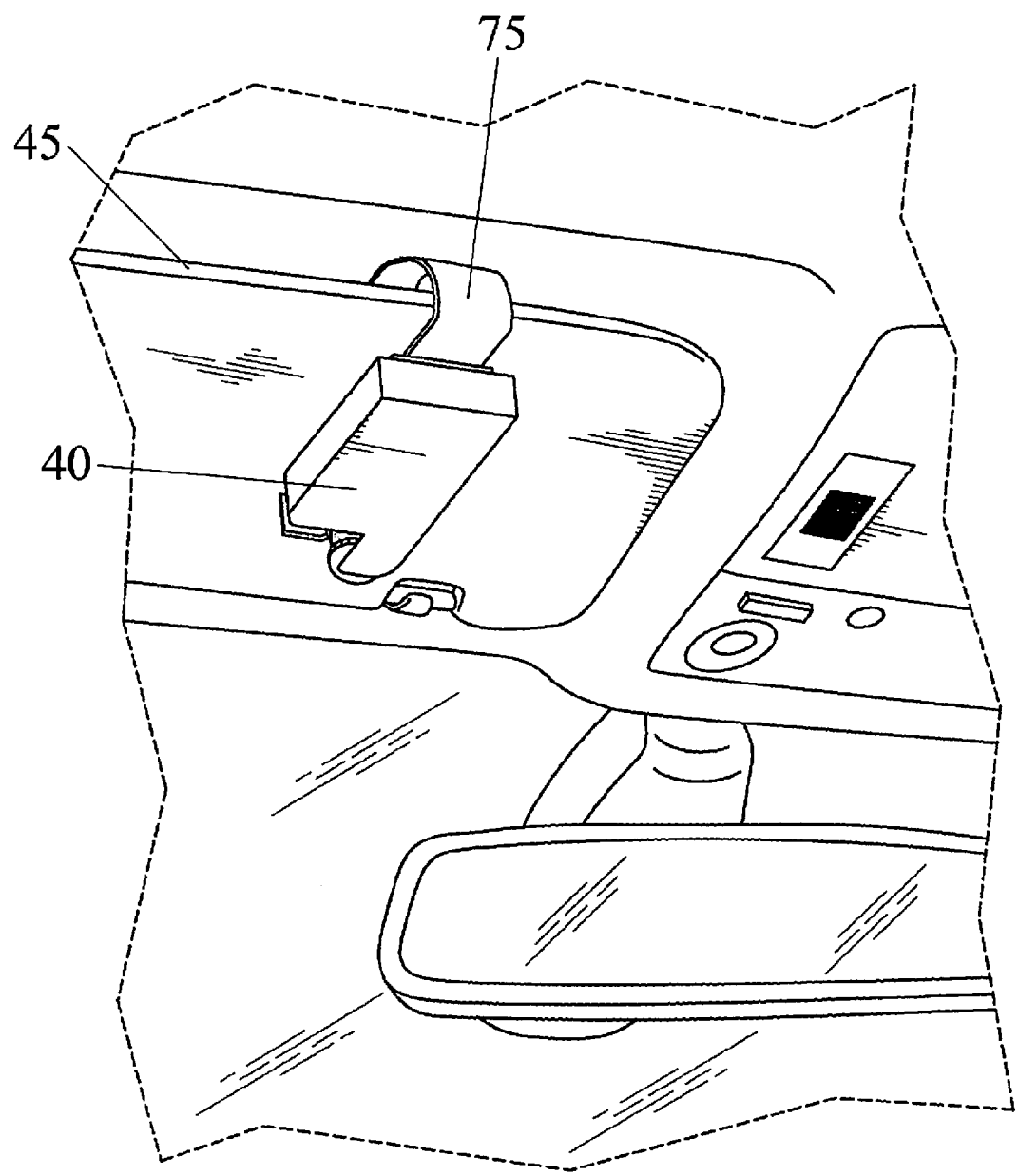
Figure 7G:
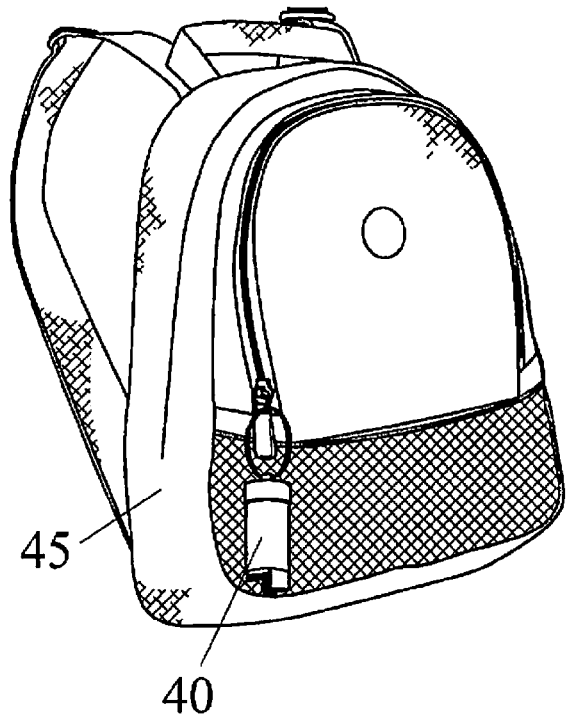
Figure 7G:
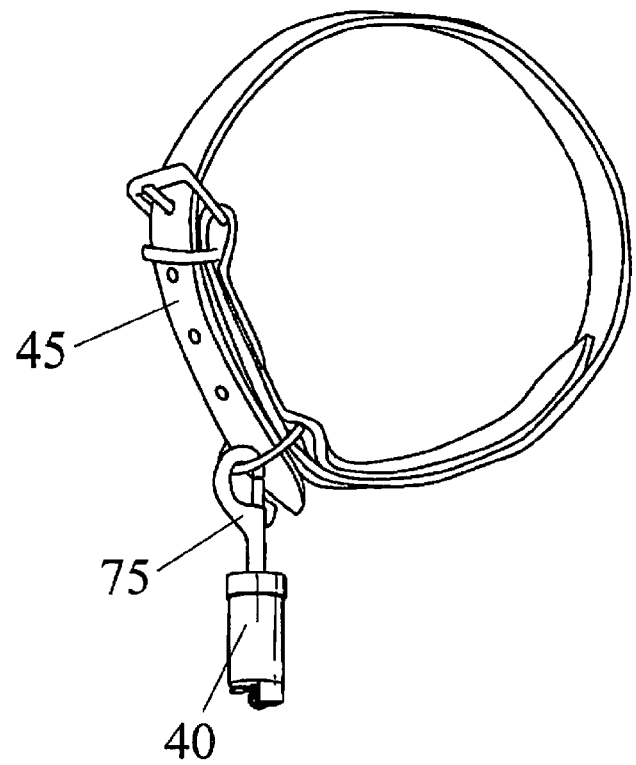

FIG. 6 shows an embodiment of the thin removable plate (65) being used with a first item (40) and a second item (45). The thin removable plate can be inserted into the at least one layer of material (67) as shown in this Figure.

The thin removable plate can further include a means of affixing on one side of an item. A means of fixing can be an adhesive, VELCRO™ or other hook and loop type fasteners, a suction cup, a snap, a buckle, a clasp, a clip or combinations thereof.

In an embodiment, the thin removable plate can have a hollowed portion, wherein the surface is curved or rounded outward. The hollowed portion can further have perforations, or holes.

In an additional embodiment, the kit can comprise two thin removable plates. One plate can be solid, while the other plate can have a hollowed portion for a quick connect and disconnect of an item.

In additional embodiments, the thin removable plate can be bigger or smaller then the dimensions as described above.

In an embodiment, the thin removable plate can have a message, such as an advertising message, a slogan, or a logo, so as to provide the dual function of holding and advertising in one step, for the device.

Kit with Fastening Means

In another embodiment, the kit for attaching and disconnecting an item comprises an assembly and a fastening means. The fastening means can further comprises a stem having a diameter small enough to slidably move inside the chamber and the stem comprises a magnetically attractable material capable of moving the magnet from a position adjacent the magnetically attractable inner plate to a position adjacent the magnetically attractable outer plate.

The stem inside the chamber of the assembly enlarges the magnetic field to a second magnetic field size moving the magnet to engage the magnetically attractable inner plate and the fastening means can magnetically attach to the assembly using the magnet for a quick connect and disconnect to the assembly.

Fastening means as described in this embodiment can be, but is not limited to a multipurpose clasp, a jeans snap, a jeans clasp, a belt clip, a purse clip, a golf bag clip, and combinations thereof.

FIGS. 7A-7G show embodiments of the fastening means (75) being used with a first item (40) and a second item (45). The embodiments of the fastening means is not limited to what is being represented in the Figures.

In another embodiment, the kit can include an assembly and a flexible magnetic piece for encircling an item. The flexible magnetic piece can be coated in fabric, foam, or any flexible material. In this embodiment, the assembly can attach using the magnet to the flexible magnetic piece for a quick connect and disconnect.

While these embodiments have been described with emphasis on the embodiments, it should be understood that within the scope of the appended claims, the embodiments might be practiced other than as specifically described herein.

What is claimed is:

1. A kit for attaching and disconnecting an item comprising:
   a. an assembly comprising a chamber having an opening, at least a bottom wall, at least one side wall and wherein the side wall is connected to the bottom wall;
   b. a magnetically attractable inner plate fixed within the chamber adjacent the bottom wall;
   c. a free moving magnet with a first magnet flat side and a second magnet flat side opposite the first magnet flat side, wherein the magnet is disposed in the chamber for moving between the magnetically attractable inner plate and a top wall, the magnet provides a magnetic field with a first magnetic field size;
   d. a magnetically attractable outer plate secured to the side wall opposite the bottom wall having a thickness and magnetic attraction strong enough to movably hold the magnet adjacent the magnetically attractable outer plate; and e. a second outer plate disposed on a top of the side wall.

2. The kit of claim 1, further comprising an engagement pin comprising:
   a. a pin head;
   b. a pin stem connected to the pin head, and wherein the pin stem is selectively removable from the chamber, and the pin stem has a diameter small enough to slidably move inside the chamber and the pin stem comprises a magnetically attractable material capable of moving the magnet from a position adjacent the magnetically attractable inner plate to a position adjacent the magnetically attractable outer plate; wherein when the pin stem is inside the chamber the free moving magnet moves to engage the magnetically attractable inner plate; and
   c. an interchangeable accessory item; wherein the interchangeable accessory item can magnetically attach to the assembly using the magnet for a quick connect and disconnect.

3. The kit of claim 2, wherein the pin head has a diameter larger than the pin stem.

4. The kit of claim 2, wherein the pin stem is cylindrical, conical, or polygonal with at least one pin stem flat face for engaging the first magnet flat side.

5. The kit of claim 2, wherein the pin stem and the pin head are a two piece unit.

6. The kit of claim 1, wherein the magnetically attractable outer plate is secured to the side wall using a fastening means selected from a group consisting of: an adhesive, a fastener, an epoxy, other bonding materials, or combinations thereof.

7. The kit of claim 1, wherein the magnetically attractable outer plate is removably secured to the side wall.

8. The kit of claim 1, wherein the chamber is round or polygon.

9. The kit of claim 1, wherein the side wall is at least a right side wall with a right side wall top and a left side wall with a left side wall top.

10. The kit of claim 1, wherein the magnet is a cylindrical-shaped magnet, a cube-shaped magnet, another geometrical shape.

11. The kit of claim 1, wherein the magnet is a solid magnet and all sides of the magnet are magnetic.

12. A kit for attaching and disconnecting an item comprising:
    a. an assembly comprising:
       (i) a chamber having an opening, at least a bottom wall, at least one side wall and wherein the side wall is connected to the bottom wall;
       (ii) a magnetically attractable inner plate fixed within the chamber adjacent the bottom wall;
       (iii) a free moving magnet with a first magnet flat side and a second magnet flat side opposite the first magnet flat side, wherein the magnet is slidably disposed in the chamber for moving between the magnetically attractable inner plate and a top wall, the magnet provides a magnetic field with a first magnetic field size;
       (iv) a magnetically attractable outer plate secured to the side wall opposite the bottom wall having a thickness and magnetic attraction strong enough to movably hold the magnet adjacent the magnetically attractable outer plate; and
       (v) a second outer plate disposed on a top of the side wall; and
    b. a thin removable plate, wherein the thin removable plate can be inserted into an item and can magnetically attach to the assembly using the magnet for a quick connect and disconnect to the assembly.

13. The kit of claim 12, wherein the thin removable plate, has a length no greater than 2.0 inches and a width no greater than 2.0 inches and a thickness between 0.125 inches and 0.0625 inches for magnetically attracting to the magnet.

14. The kit of claim 12, wherein the thin removable plate, comprises a magnetic alloy.

15. The kit of claim 12, wherein the thin removable plate further comprising a coating disposed on the thin removable plate to perform an advertising function.

16. The kit of claim 12, wherein the thin removable plate can have a means of affixing on one side of an item.

17. A kit for attaching and disconnecting an item comprising:
    a. an assembly comprising:
       (i) a chamber having an opening, at least a bottom wall, at least one side wall and wherein the side wall is connected to the bottom wall;
       (ii) a magnetically attractable inner plate fixed within the chamber adjacent the bottom wall;
       (iii) a free moving magnet with a first magnet flat side and a second magnet flat side opposite the first magnet flat side, wherein the magnet is disposed in the chamber, wherein the magnet provides a magnetic field with a first magnetic field size;
       (iv) a magnetically attractable outer plate secured to the side wall opposite the bottom wall having a thickness and magnetic attraction strong enough to hold the magnet adjacent the magnetically attractable outer plate; and
       (v) a second outer plate disposed on a top of side wall; and
    b. a fastening means comprising:
       (i) a stem having a diameter small enough to slidably move inside the chamber and the stem comprises a magnetically attractable material capable of moving the magnet from a position adjacent the magnetically attractable inner plate to a position adjacent the magnetically attractable outer plate;
       (ii) wherein the stem inside the chamber enlarges the magnetic field to a second magnetic field size moving the magnet to engage the magnetically attractable inner plate; and
       (iii) wherein the fastening means can be magnetically attached to the assembly using the magnet for a quick connect and disconnect.

* * * * *